United States Patent [19]

Ueno et al.

[11] Patent Number: 4,804,415

[45] Date of Patent: Feb. 14, 1989

[54] PROCESS FOR PRODUCING AZO PIGMENT

[75] Inventors: Ryuzo Ueno; Shigeru Ito, both of Nishinomiya; Shin Fujimoto, Itami; Mayumi Iwao, Minoo, all of Japan

[73] Assignee: Kabushiki Kaisha Ueno Seiyaku Oyo Kenkyujo, Osaka, Japan

[21] Appl. No.: 80,307

[22] Filed: Jul. 31, 1987

[30] Foreign Application Priority Data

Aug. 4, 1986 [JP] Japan ................................. 61-181844

[51] Int. Cl.$^4$ ...................... C09B 29/01; C09B 29/15
[52] U.S. Cl. .................................... 106/496; 106/402; 534/839; 534/861; 534/883
[58] Field of Search ...................... 534/839, 861, 883; 106/288 Q, 289, 309

[56] References Cited

U.S. PATENT DOCUMENTS

| | | | |
|---|---|---|---|
| 4,224,221 | 9/1980 | Burley et al. | 534/823 |
| 4,224,222 | 9/1980 | Burley et al. | 260/202 |
| 4,530,724 | 7/1985 | Ueno et al. | 106/309 |
| 4,655,844 | 4/1987 | Ueno et al. | 106/288 Q |

FOREIGN PATENT DOCUMENTS 116753 9/1981 Japan .
42662 3/1983 Japan .

OTHER PUBLICATIONS

European Search Report dated Jan. 15, 1988.

*Primary Examiner*—Paul Lieberman
*Assistant Examiner*—Helene Kirschner
*Attorney, Agent, or Firm*—Sherman and Shalloway

[57] ABSTRACT

A process for producing an azo pigment, which comprises coupling an aromatic diazonium compound with 3-hydroxy-2-naphthoic acid and at least one binaphthol and optionally, laking the resulting pigment.

13 Claims, No Drawings

PROCESS FOR PRODUCING AZO PIGMENT

This invention relates to a process for producing an azo pigment, particularly a toned azo pigment, by coupling an aromatic diazonium compound with 3-hydroxy-2-naphthoic acid.

Toning, as used in the present application, means the control and improvement of the properties or characteristics, such as hue, brilliance, transparency and hiding power, of a pigment by some means.

Azo pigments produced by using 3-hydroxy-2-naphthoic acid as a coupling component are well known. For example, they include Brilliant Carmine 6B (Pigment Red 57) and Watchung Red (Pigment Red 48). They are obtained by coupling a diazonium salt of 6-amino-m-toluenesulfonic acid and a diazonium salt of 6-amino-4-chloro-m-toluenesulfonic acid respectively with 3-hydroxy-2-naphthoic acid. These azo pigments find a diversity of applications and are mainly used to color printing inks, paints, oil and water colors, plastics and cosmetics. There are various properties of the pigments which are required in these applications. For example, brilliance and transparency are required for printing inks; durability and hiding power, for paints; and heat resistance, for plastics. It is necessary therefore to prepare pigments of the same chemical structure but having different properties or characteristics according to the intended fields of application.

The color and other properties of a pigment are basically derived from its chemical structure, but the brilliance, transparency and hiding power of the pigment vary also with the physical factors of the pigment, for example, the fineness, form and shape and surface conditions of its particles. The properties of characteristics of the pigment can be controlled to some extent by changing the manufacturing steps or using additives such as wood rosin, but to no satisfactory extent. It is also known to control the color and physical properties of the pigment by replacing part of 3-hydroxy-2-naphthoic acid as a coupling component with a suitable amount of a toning compound. For example, the specifications of Japanese Laid-Open Patent Publications Nos. 116753/1981 and 42662/1983 describe several compounds as a toning agent. The toning effects of these toning agents, however, do not prove to be entirely satisfactory.

The present inventors have made extensive investigations on toning compounds which can tone the color hue of azo pigments as desired. These investigations have now led to the discovery that an azo pigment toned as desired can be produced by replacing part of 3-hydroxy-2-naphthoic acid as a coupling component with binaphthol.

Thus, according to this invention, there is provided a process for producing a toned azo pigment, which comprises coupling an aromatic diazonium compound with 3-hydroxy-2-naphthoic acid and at least one binaphthol, and optionally laking the resulting pigment.

The binaphthol used in this invention is a compound having a basic skeleton represented by the general formula

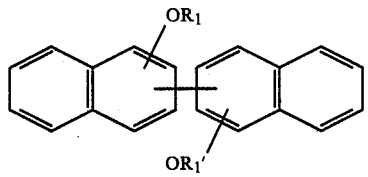

wherein $R_1$ and $R_1'$, independent from each other, represent a hydrogen atom or an alkyl group having not more than 5 carbon atoms.

Specific examples of binaphthols having the basic skeleton of formula I are compounds represented by the following general formulae.

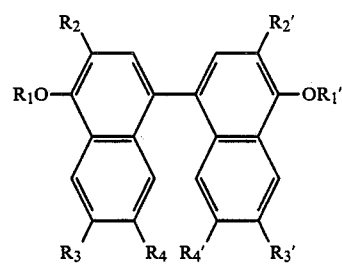

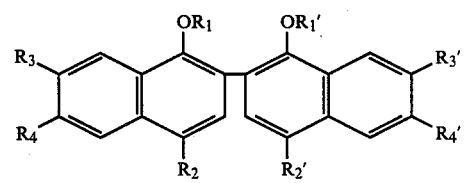

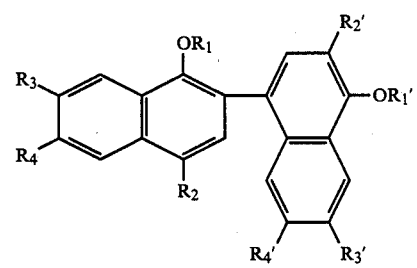

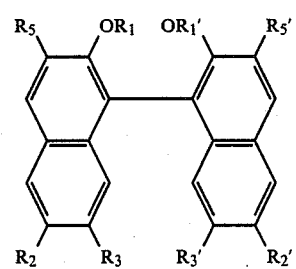

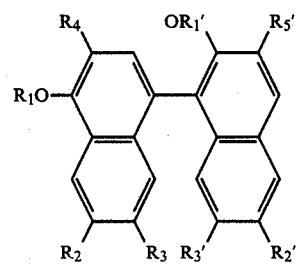

and

-continued

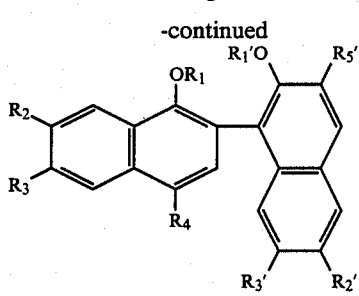

In the above formulae, $R_1$ and $R_1'$ are as defined above; $R_2$, $R_2'$, $R_3$, $R_3'$, $R_4$ and $R_4'$, independently from each other, represent a hydrogen atom, an alkyl group having not more than 5 carbon atoms, a halogen atom, a carboxyl group, an alkoxycarbonyl group, a nitro group or a sulfone group; and $R_5$ and $R_5'$, independently from each other, represent a hydrogen atom, an alkyl group having not more than 5 carbon atoms, a halogen atom, an alkoxycarbonyl group, a nitro group or a sulfone group.

The binaphthol of formula I used in this invention is obtained by the reaction of naphthols with each other. Examples of the naphthols include
1-naphthol,
2-naphthol,
methyl-1-naphthol,
methyl-2-naphthol,
chloro-1-naphthol,
chloro-2-naphthol,
bromo-1-naphthol,
bromo-2-naphthol,
1-naphtholsulfonic acid,
2-naphtholsulfonic acid,
nitro-1-naphthol,
nitro-2-naphthol,
1-methoxynaphthalene,
2-methoxynaphthalene,
1-methoxy-2-naphthoic acid,
2-methoxy-1-naphthoic acid,
2-methoxy-3-naphthoic acid,
2-methoxy-6-naphthoic acid,
1-hydroxy-2-naphthoic acid,
2-hydroxy-1-naphthoic acid,
2-hydroxy-6-naphthoic acid,
1-hydroxy-2-naphthoic acid esters,
2-hydroxy-1-naphthoic acid esters,
2-hydroxy-3-naphthoic acid esters, and
2-hydroxy-6-naphthoic acid esters.

Specific examples of the binaphthol of formula I include
4,4'-dihydroxy-1,1'-dinaphthyl,
4,4'-dihydroxy-3-chloro-1,1'-dinaphthyl,
4,4'-dihydroxy-3-methyl-1,1'-dinaphthyl,
4,4'-dihydroxy-6-methyl-1,1'-dinaphthyl,
4,4'-dihydroxy-7-methyl-1,1'-dinaphthyl,
4,4'-dihydroxy-1,1'-dinaphthyl-3,3'-dicarboxylic acid,
1,1'-dihydroxy-2,2'-dinaphthyl,
1,1'-dihydroxy-2,2'-dinaphthyl-4,4'-dicarboxylic acid,
1,1'-dihydroxy-4,4'-dichloro-2,2'-dinaphthyl,
1,4'-dihydroxy-2,1'-dinaphthyl,
4,1'-dihydroxy-1,2'-dinaphthyl-3-carboxylic acid,
2,2'-dihydroxy-1,1'-dinaphthyl,
2,2'-dihydroxy-1,1'-dinaphthyl-6,6'-dicarboxylic acid,
2,2'-dihydroxy-1,1'-dinaphthyl-6-carboxylic acid,
2,2'-dihydroxy-3-chloro-1,1'-dinaphthyl,
2,2'-dihydroxy-3-nitro-1,1'-dinaphthyl,
2,2'-dihydroxy-1,1'-dinaphthyl-3-sulfonic acid,
2,2'-dihydroxy-3-methyl-1,1'-dinaphthyl,
2,2'-dihydroxy-6-methyl-1,1'-dinaphthyl,
2,2'-dihydroxy-7-methyl-1,1'-dinaphthyl,
methyl 2,2'-dihydroxy-1,1'-dinaphthyl-3-carboxylate,
2,2'-dimethoxy-1,1'-dinaphthyl-3,3'-dicarboxylic acid,
2,4'-dihydroxy-3-chloro-1,1'-dinaphthyl,
2,4'-dihydroxy-3-methyl-1,1'-dinaphthyl,
2,4'-dihydroxy-1,1'-dinaphthyl-6-carboxylic acid,
1,2'-dihydroxy-2,1'-dinaphthyl,
2,1'-dihydroxy-1,2'-dinaphthyl-6-carboxylic acid, and
2,1'-dihydroxy-3-chloro-1,2'-dinaphthyl.

The process of this invention is performed by diazotizing an aromatic amine, and coupling the resulting aromatic diazonium compound with the aforesaid coupling component mixture. The amount of the binaphthol added is not particularly limited. If, however, it is too large, isolation from the inherent pigment color and the reduction of water resistance which is one important function of the pigment may possibly occur. Accordingly, by taking economy also into account, the amount of the binaphthol added is generally 0.1 to 10% by weight, preferably 0.2 to 2.0% by weight. The diazotization and coupling may be carried out in a customary manner.

When, for example, 6-amino-4-chloro-m-toluenesulfonic acid, 2-amino-5-chloro-p-toluenesulfonic acid, 2-amino-4-chlorobenzoic acid, 6-amino-m-toluenesulfonic acid, 5-amino-2-chlorobenzenesulfonic acid, 2-aminonaphthalene-1-sulfonic acid and aniline are used as the aromatic amine, toned Pigment Red 48, Pigment Red 52, Pigment Red 55, Pigment Red 57, Pigment Red 58, Pigment Red 63 and Pigment Red 64 are respectively obtained as the azo pigment.

Other toned azo pigments can be likewise produced by reacting other aromatic diazonium compounds with 2-hydroxy-3-naphthoic acid and binaphthols.

Conventional laking agents such as calcium salts, barium salts, strontium salts and manganese salts may be used, and the laking may be carried out in a customary manner.

Although the present invention is not bound by any theory, it is presumed that by replacing part of 3-hydroxy-2-naphthoic acid as a coupling component with a suitable amount of at least one binaphthol, the growth of crystals during pigment synthesis is affected, and consequently, change occurs in mass tone, tint and/or transparency. The toning effect varies depending upon the type of the diazonium compound used or the type and amount of the binaphthol used.

For example, in the case of Brilliant Carmine 6B (Pigment Red 57) which is very important as a red pigment for printing inks and is frequently used in general, the use of 2,2'-dihydroxy-1,1'-dinaphthyl, for example, as the binaphthol exhibits outstanding toning effects such as darkened mass tone, blued tint, brightened chroma and increased transparency. Similar toning effects can be obtained by using 2,2'-dihydroxy-1,1'-dinaphthyl-6,6'-dicarboxylic acid, 4,4'-dihydroxy-1,1'-dinaphthyl, 1,1'-dihydroxy-2,2'-dinaphthyl, and 4,4'-dihydroxy-1,1'-dinaphthyl-3,3'-dicarboxylic acid as the binaphthol. Furthermore, the use of, for example, 2,2'-dihydroxy-1,1'-dinaphthyl as the binaphthol gives similar great toning effects to Watchung Red (Pigment Red 48) which is one of important red pigments for printing inks.

With red printing inks, the color hue of redness as well as chroma and transparency constitute important factors in evaluating the red printing inks, and there is a strong demand for red printing inks having more brilliance and a higher degree of transparency. As is clearly seen from the foregoing statement, the pigments obtained by the process of this invention can fully meet these requirements.

The process of this invention is highly valuable from an industrial point of view because it can give variously toned azo pigments, its toning effects are greater than those of known methods, and it can meet a wide variety of requirements in relation to coloring.

The following non-limitative examples specifically illustrate the present invention.

Example of Producing Binaphthol

Fifty grams of 2-naphthol was added to a solution of 14 g of sodium hydroxide in 750 g of water. The mixture was heated to 90° C. to form a solution. A solution of 130 g of ferric chloride in 300 g of water was added to the resulting solution, and the mixture was reacted at 90° to 95° C. for 2 hours. After the reaction, the solution was cooled to 70° to 75° C., and filtered. The filtrate was added to 600 ml of a 5% aqueous solution of sodium hydroxide. The mixture was stirred for several minutes, and again filtered. The filtrate was precipitated with dilute sulfuric acid, filtered, washed with water and dried to give 38.7 g (yield 78%) of 2,2'-dihydroxy-1,1'-dinaphthyl.

EXAMPLE 1

(a) Twelve grams of 6-amino-m-toluenesulfonic acid was dissolved in a solution of 2.8 g of sodium hydroxide in 200 ml of water, and 15 g of 35% hydrochloric acid was added to form a precipitate. At a temperature of 0° C., a solution of 4.4 g of sodium nitrite in 20 ml of water was added dropwise, and the mixture was stirred for 1 hour to perform diazotization. Separately, 12.2 g of 3-hydroxy-2-naphthoic acid was dissolved in a solution of 7.3 g of sodium hydroxide in 150 ml of water. The resulting solution was maintained at 0° C., and the above diazonium salt solution was gradually added to it. The mixture was stirred for 2 hours to perform coupling. After the reaction, 70 ml of water was added, and the pH of the solution was adjusted to 8.0 to 8.5 with a 10% aqueous solution of acetic acid. Then, while the solution was kept at 18° C., a solution of 9.1 g of calcium chloride in 40 ml of water was added. The mixture was heated to 90° C., and stirred for 30 minutes. Filtration, washing with water and drying gave a calcium salt of Brilliant Carmine 6B.

(b) A pigment toned in accordance with the present invention was produced by operating in the same way as in (a) above except that 3-hydroxy-1-naphthoic acid containing 1% by weight or 2% by weight of 2,2'-dihydroxy-1,1'-dinaphthyl (toning agent A) was used instead of 3-hydroxy-2-naphthoic acid.

(c) A toned pigment for comparison was produced by operating in the same way as in (a) above except that 3-hydroxy-2-naphthoic acid containing 2% by weight of 2,2'-dihydroxy-3,3'-dicarboxy-1,1'-dinaphthyl (toning agent B; see the specification of Japanese Laid-Open Patent Publication No. 116753/1981) was used instead of 3-hydroxy-2-naphthoic acid.

In a Hoover muller, each of the resulting pigments was kneaded with No. 4 varnish in the amount stipulated by the Japanese Industrial Standards. The resulting pigment sample containing the toning agent and a standard sample were spread side by side to evaluate the toning effect. The dominant wavelength ($\lambda_d$), lightness (Y) and excitation purity (Pe) of each of the pigment samples were measured, and the results are shown in Table 1.

TABLE 1

| Toning agent | wt. % of the toning agent | $\lambda_d$ (nm) | Y (%) | Pe (%) | Mass tone | Tint |
|---|---|---|---|---|---|---|
| None | — | 493.8 C | 7.2 | 68.3 | Standard | Standard |
| A | 1.0 | 494.0 C | 6.75 | 65.7 | Very dark | Very blue |
| A | 2.0 | 494.5 C | 6.15 | 72.2 | Extremely dark | Extremely blue |
| B | 2.0 | 493.9 C | 7.10 | 69.1 | Slightly dark | Slightly blue |

EXAMPLE 2

By operating in the same way as in Example 1, (a), a diazonium salt of 6-amino-4-chloro-m-toluenesulfonic acid was coupled with 3-hydroxy-2-naphthoic acid to produce a calcium salt of Watchung Red.

A toned pigment was produced by operating in the same way as above except that 2% by weight of the coupling component used was replaced by 2,2'-dihydroxy-1,1'-dinaphthyl (toning agent A).

The toning effects of the resulting pigments were evaluated as in Example 1. The dominant wavelengths ($\lambda_d$), lightnesses (Y) and excitation purities (Pe) of the pigments were measured, and the results are shown in Table 2.

TABLE 2

| Toning agent (wt. %) | $\lambda_d$ (nm) | Y (%) | Pe (%) | Mass tone | Tint |
|---|---|---|---|---|---|
| — | 494 C | 6.55 | 78.5 | Standard | Standard |
| 2.0 | 494.5 C | 5.4 | 84.7 | Very dark | Slightly blue |

EXAMPLE 3

A calcium salt of Brilliant Carmine 6B was produced in the same way as in Example 1, (a).

A toned pigment was produced by operating in the same way as above except that 2% by weight of 3-hydroxy-2-naphthoic acid used was replaced by 2,2'-dihydroxy-1,1'-dinaphthyl-6,6'-dicarboxylic acid (toning agent C).

The toning effects of the resulting pigments were evaluated as in Example 1. The dominant wavelengths ($\lambda_d$), lightnesses (Y) and excitation purities (Pe) of the pigments were measured, and the results are shown in Table 3.

TABLE 3

| Toning agent (wt. %) | $\lambda_d$ (nm) | Y (%) | Pe (%) | Mass tone | Tint |
|---|---|---|---|---|---|
| — | 493.8 C | 7.2 | 68.3 | Standard | Standard |
| 2.0 | 494.1 C | 7.0 | 62.4 | Slightly dark | Considerably blue |

EXAMPLE 4

A calcium salt of Watchung Red was produced by coupling a diazonium salt of 6-amino-4-chloro-m-toluenesulfonic acid with 3-hydroxy-2-naphthoic acid by operating in the same way as in Example 1, (a).

A toned pigment was produced by operating in the same way as above except that 2% by weight of the coupling component used was replaced by 2,2'-dihydroxy-1,1'-dinaphthyl-6,6'-dicarboxylic acid (toning agent C).

The toning effects of the resulting pigments were evaluated as in Example 1. The dominant wavelengths ($\lambda_d$), lightnesses (Y) and excitation purities (Pe) of the pigments were measured, and the results are shown in Table 4.

TABLE 4

| Toning agent (wt. %) | $\lambda_d$ (nm) | Y (%) | Pe (%) | Mass tone | Tint |
|---|---|---|---|---|---|
| — | 494 C | 6.35 | 78.5 | Standard | Standard |
| 2.0 | 494.2 C | 5.55 | 84.3 | Considerably dark | Slightly blue |

EXAMPLE 5

A calcium salt of Brilliant Carmine 6B was produced in the same way as in Example 1, (a).

Toned pigments were produced by operating in the same way as above except that 2% by weight of 3-hydroxy-2-naphthoic acid used was replaced by 2,2'-dihydroxy-1,1'-dinaphthyl (toning agent A) and 2,2'-dihydroxy-1,1'-dinaphthyl-6,6'-dicarboxylic acid (toning agent C).

The toning effects of the resulting pigments were evaluated. The dominant wavelengths ($\lambda_d$), lightnesses (Y) and excitation purities (Pe) of the pigments were measured, and the results are shown in Table 5.

TABLE 5

| Toning agent | wt. % of the toning agent | $\lambda_d$ (nm) | Y (%) | Pe (%) | Mass tone | Tint |
|---|---|---|---|---|---|---|
| None | — | 493.8 C | 7.2 | 68.3 | Standard | Standard |
| C | 2.0 | 494.1 C | 7.0 | 62.4 | Slightly dark | Considerbly blue |
| A | 2.0 | 494.3 C | 6.15 | 72.2 | Extremely dark | Extremely blue |
| A + C (1:1) | 2.0 | 494 C | 6.75 | 71.6 | Extremely dark | Extremely blue |

EXAMPLE 6

A calcium salt of Watchung Red was produced in the same way as in Example 4.

Toned pigments were produced by operating in the same way as above except that 2% by weight of 3-hydroxy-2-naphthoic acid used was replaced by the toning agents described in Example 5.

The toning effects of the pigments were evaluated as in Example 1. The dominant wavelengths ($\lambda_d$), lightnesses (Y) and excitation purities (Pe) of the pigments were measured, and the results are shown in Table 6.

TABLE 6

| Toning agent | wt. % of the toning agent | $\lambda_d$ (nm) | Y (%) | Pe (%) | Mass tone | Tint |
|---|---|---|---|---|---|---|
| None | — | 494 C | 6.35 | 78.5 | Standard | Standard |
| C | 2.0 | 494.2 C | 5.55 | 84.3 | Considerbly dark | Slightly blue |
| A | 2.0 | 494.5 C | 5.4 | 84.7 | Extremely dark | Slightly blue |
| A + C (1:1) | 2.0 | 494.8 C | 4.4 | 83.7 | Extremely dark | Slightly blue |

What is claimed is:

1. A process for producing a toned azo pigment, which comprises coupling an aromatic diazonium compound with 3-hydroxy-2-naphthoic acid and at least one binaphthol selected from the group consisting of compounds represented by the formulae

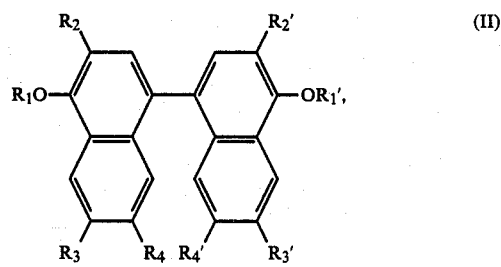

(II)

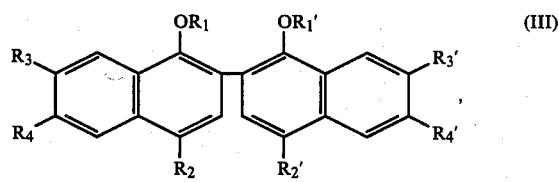

(III)

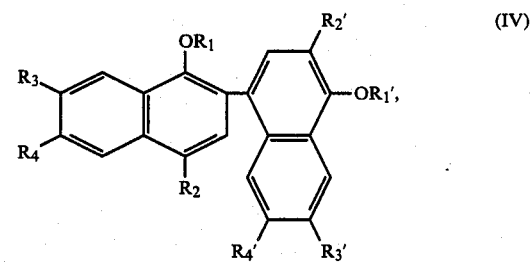

(IV)

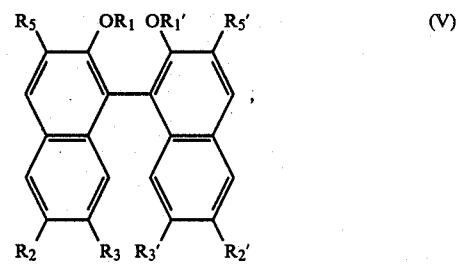

(V)

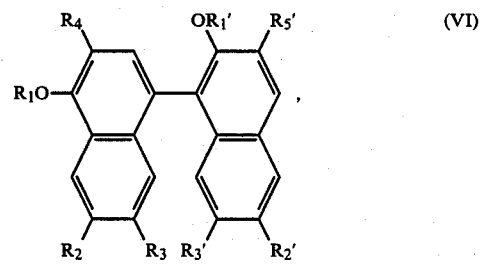

(VI)

and

-continued

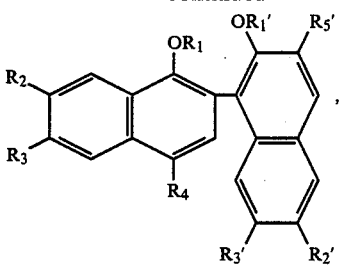
(VII)

wherein
R₁ and R₁', independently, represent a hydrogen atom or an alkyl group of not more than 5 carbon atoms,
R₂, R₂', R₃, R₃', R₄ and R₄', independently, represent a hydrogen atom, an alkyl group of not more than 5 carbon atoms, a halogen atom, a carboxyl group, an alkoxycarbonyl group, a nitro group or a sulfone group, and
R₅ and R₅', independently, represent a hydrogen atom, an alkyl group of not more than 5 carbon atoms, a halogen atom, an alkoxycarbonyl group, a nitro group or a sulfone group; and
optionally, laking the resulting pigment.

2. The process according to claim 1, wherein said at least one binaphthol is represented by the formula

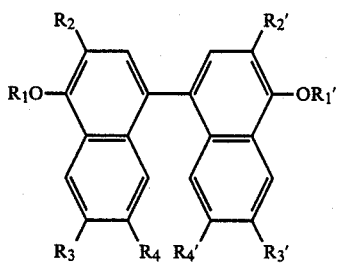
(II)

wherein
R₁ and R₁', independently, represent a hydrogen atom or an alkyl group of not more than 5 carbon atoms, and
R₂, R₂', R₃, R₃', R₄ and R₄', independently, represent a hydrogen atom, an alkyl group of not more than 5 carbon atoms, a halogen atom, a carboxyl group, an alkoxycarbonyl group, a nitro group or a sulfone group.

3. The process according to claim 2, wherein said binaphthol is selected from the group consisting of
4,4'-dihydroxy-1,1'-dinaphthyl,
4,4'-dihydroxy-3-chloro-1,1'-dinaphthyl,
4,4'-dihydroxy-3-methyl-1,1'-dinaphthyl,
4,4'-dihydroxy-6-methyl-1,1'-dinaphthyl,
4,4'-dihydroxy-7-methyl-1,1'-dinaphthyl, and
4,4'-dihydroxy-1,1'-dinaphthyl-3,3'-dicarboxylic acid.

4. The process according to claim 1, wherein said at least one binaphthol is represented by the formula

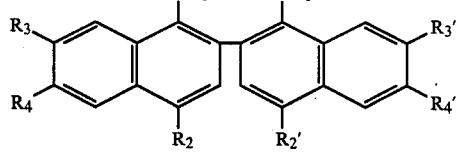
(III)

wherein
R₁ and R₁', independently, represent a hydrogen atom or an alkyl group of not ore than 5 carbon atoms, and
R₂, R₂', R₃, R₃', R₄ and R₄', independently, represent a hydrogen atom, an alkyl group of not more than 5 carbon atoms, a halogen atom, a carboxyl group, an alkoxycarbonyl group, a nitro group or a sulfone group.

5. The process according to claim 4, wherein said binaphthol is selected from the group consisting of
1,1'-dihydroxy-2,2'-dinaphthyl,
1,1'-dihydroxy-2,2'-dinaphthyl-4,4'-dicarboxylic acid, and
1,1'-dihydroxy-4,4'-dichloro-2,2'-dinaphthyl.

6. The process according to claim 1, wherein said at least one binaphthol is represented by the formula

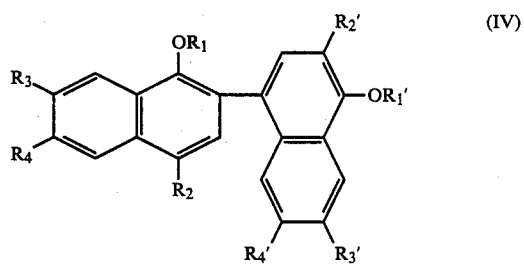
(IV)

wherein
R₁ and R₁', independently, represent a hydrogen atom or an alkyl group of not more than 5 carbon atoms, and
R₂, R₂', R₃, R₃', R₄ and R₄', independently, represent a hydrogen atom, an alkyl group of not more than 5 carbon atoms, a halogen atom, a carboxyl group, an alkoxycarbonyl group, a nitro group or a sulfone group.

7. The process according to claim 6, wherein said binaphthol is selected from the group consisting of
1,4'-dihydroxy-2,1'-dinaphthyl, and
4,1'-dihydroxy-1,2'-dinaphthyl-3-carboxylic acid.

8. The process according to claim 1, wherein said at least one binaphthol is represented by the formula

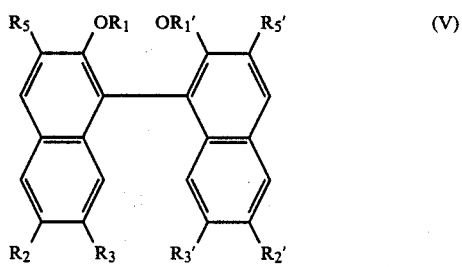
(V)

wherein $R_1$ and $R_1'$, independently, represent a hydrogen atom or an alkyl group of not more than 5 carbon atoms, $R_2$, $R_2'$, $R_3$ and $R_3'$, independently, represent a hydrogen atom, an alkyl group of not more than 5 carbo atoms, a halogen atom, a carboxyl group, an alkoxycarbonyl group, a nitro group or a sulfone group, and $R_5$ and $R_5'$, independently, represent a hydrogen atom, an alkyl group of not more than 5 carbon atoms, a halogen atom, an alkoxycarbonyl group, a nitro group or a sulfone group.

9. The process according to claim 8, wherein said binaphthol is selected from the group consisting of
2,2'-dihydroxy-1,1'-dinaphthyl,
2,2'-dihydroxy-1,1'-dinaphthyl-6,6'-dicarboxylic acid,
2,2'-dihydroxy-1,1'-dinaphthyl-6-carboxylic acid,
2,2'-dihydroxy-3-chloro-1,1'-dinaphthyl,
2,2'-dihydroxy-3-nitro-1,1'-dinaphthyl,
2,2'-dihydroxy-1,1'-dinaphthyl-3-sulfonic acid,
2,2'-dihydroxy-3-methyl-1,1'-dinaphthyl,
2,2'-dihydroxy-6-methyl-1,1'-dinaphthyl,
2,2'-dihydroxy-7-methyl-1,1'-dinaphthyl,
methyl 2,2'-dihydroxy-1,1'-dinaphthyl-3-carboxylate, and
2,2'-dimethoxy-1,1'-dinaphthyl-3,3'-dicarboxylic acid.

10. The process according to claim 1, wherein said at least one binaphthol is represented by the formula

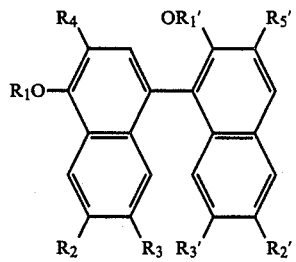

(VI)

wherein
$R_1$ and $R_1'$, independently, represent a hydrogen atom or an alkyl group of not more than 5 carbon atoms, $R_2$, $R_2'$, $R_3$, $R_3'$ and $R_4$, independently, represent a hydrogen atom, an alkyl group of not more than 5 carbon atoms, a halogen atom, a carboxyl group, an alkoxycarbonyl group, a nitro group or a sulfone group, and $R_5'$ represents a hydrogen atom, an alkyl group of not more than 5 carbon atoms, a halogen atom, an alkoxycarbonyl group, a nitro group or a sulfone group.

11. The process according to claim 10, wherein said binaphthol is selected from the group consisting of
2,4'-dihydroxy-3-chloro-1,1'-dinaphthyl,
2,4'-dihydroxy-3-methyl-1,1'-dinaphthyl, and
2,4'-dihydroxy-1,1'-dinaphthyl-6-carboxylic acid.

12. The process according to claim 1, wherein said at least one binaphthol is represented by the formula

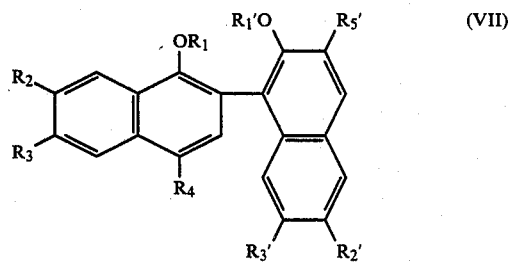

(VII)

wherein
$R_1$ and $R_1'$, independently, represent a hydrogen atom or an alkyl group of not more than 5 carbon atoms, $R_2$, $R_2'$, $R_3$, $R_3'$ and $R_4$, independently, represent a hydrogen atom, an alkyl group of not more than 5 carbon atoms, a halogen atom, a carboxyl group, an alkoxycarbonyl group, a nitro group or a sulfone group, and $R_5'$ represents a hydrogen atom, an alkyl group of not more than 5 carbon atoms, a halogen atom, an alkoxycarbonyl group, a nitro group or a sulfone group.

13. The process according to claim 12, wherein said binaphthol is selected from the group consisting of
1,2'-dihydroxy-2,1'-dinaphthyl,
2,1'-dihydroxy-1,2'-dinaphthyl-6-carboxylic acid, and
2,1'-dihydroxy-3-chloro-1,2'-dinaphthyl.

* * * * *